United States Patent
Chen et al.

(10) Patent No.: US 8,713,348 B2
(45) Date of Patent: Apr. 29, 2014

(54) APPARATUS FOR PERFORMING TIMER MANAGEMENT REGARDING A SYSTEM TIMER SCHEDULER SERVICE, AND ASSOCIATED METHOD

(75) Inventors: Ming-Chi Chen, Taipei County (TW); Ching-Chao Yang, Hsinchu (TW); Chun-Kun Chan, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 457 days.

(21) Appl. No.: 12/870,851

(22) Filed: Aug. 30, 2010

(65) Prior Publication Data

US 2012/0054513 A1 Mar. 1, 2012

(51) Int. Cl.
*G06F 1/00* (2006.01)

(52) U.S. Cl.
USPC .......................................................... 713/501

(58) Field of Classification Search
USPC .................................. 713/300–340, 500–502
See application file for complete search history.

(56) References Cited

U.S. PATENT DOCUMENTS

| | | | |
|---|---|---|---|
| 6,016,548 A * | 1/2000 | Nakamura et al. | 713/323 |
| 6,195,699 B1 * | 2/2001 | Dennis | 709/229 |
| 6,219,827 B1 * | 4/2001 | Man | 717/128 |
| 6,965,763 B2 | 11/2005 | Bussan | |
| 7,032,211 B1 * | 4/2006 | Janzig et al. | 717/120 |
| 7,386,749 B2 | 6/2008 | Rifani | |
| 7,478,186 B1 * | 1/2009 | Onufryk et al. | 710/263 |
| 7,734,905 B2 * | 6/2010 | Wang et al. | 713/100 |
| 7,912,518 B2 | 3/2011 | Uh | |
| 2007/0157207 A1 * | 7/2007 | Kim et al. | 718/103 |

FOREIGN PATENT DOCUMENTS

| | | |
|---|---|---|
| CN | 101133375 A | 2/2008 |
| CN | 101163306 A | 4/2008 |
| TW | 586072 | 5/2004 |
| TW | I228885 | 3/2005 |
| TW | I235564 | 7/2005 |
| TW | 200841179 | 10/2008 |

OTHER PUBLICATIONS

Structured Computer Organization third edition by Andrew S. Tanenbaum 1990 pp. 11-13.*

* cited by examiner

*Primary Examiner* — Paul R Myers
(74) *Attorney, Agent, or Firm* — Winston Hsu; Scott Margo

(57) ABSTRACT

An apparatus for performing timer management regarding a system timer scheduler service includes: a processor arranged to control operations of the apparatus; an ordinary timer arranged to provide the processor with time ticks, for use of timing control; and a hardware-based Operating System (OS) timer arranged to provide the processor with at least one scheduler timer, for use of the system timer scheduler service. An associated method for performing timer management regarding a system timer scheduler service is also provided, and can be applied to the apparatus. In particular, the apparatus and the method can give considerations to both run-time power consumption and sleep mode power consumption. For example, the hardware-based OS timer can support an event-based OS timer scheduler to save the run-time power consumption. In another example, the hardware-based OS timer can support timer alignment in accordance with modulator/demodulator (modem) activities to minimize the sleep mode power consumption.

20 Claims, 7 Drawing Sheets

US 8,713,348 B2

APPARATUS FOR PERFORMING TIMER MANAGEMENT REGARDING A SYSTEM TIMER SCHEDULER SERVICE, AND ASSOCIATED METHOD

BACKGROUND

The present invention relates to Real Time Operating System (RTOS) timer scheduler mechanism, and more particularly, to an apparatus for performing timer management regarding a system timer scheduler service, and to an associated method.

According to the related art, the so-called RTOSs can be regarded as a class of operating systems (OSs) that are intended for real time-applications, where a real time application is typically known as an application that guarantees both correctness of result and the added constraint of meeting a deadline. In a conventional electronic device comprising a processor equipped with an RTOS timer scheduler service, some conventional scheduler timers (e.g. scheduler timer events, or scheduler events) can be utilized for timing control of applications or tasks. However, these conventional scheduler timers are typically implemented with software modules. As a result, some problems may occur. For example, the conventional scheduler timers may be unreliable in some situations due to their software-based characteristics. In another example, interference between the conventional scheduler timers may cause one of them to miss a deadline, and therefore, it seems unlikely that an application or task using the conventional scheduler timer that misses the deadline can be performed in time. Thus, a novel method is required for properly controlling operations regarding an RTOS timer scheduler service.

SUMMARY

It is therefore an objective of the claimed invention to provide an apparatus for performing timer management regarding a system timer scheduler service, and to provide an associated method, in order to solve the above-mentioned problems.

It is another objective of the claimed invention to provide an apparatus for performing timer management regarding a system timer scheduler service, and to provide an associated method, in order to optimize the low power performance of operations regarding the system timer scheduler service, with the aid of a mechanism to provide the "aligned-timer" via considering Modem Timer's activities.

An exemplary embodiment of an apparatus for performing timer management regarding a system timer scheduler service comprises: a processor arranged to control operations of the apparatus; an ordinary timer arranged to provide the processor with time ticks, for use of timing control; and a hardware-based OS timer arranged to provide the processor with at least one scheduler timer, for use of the system timer scheduler service.

An exemplary embodiment of an associated method for performing timer management regarding a system timer scheduler service is provided, where the method is applied to an apparatus, and the apparatus comprises a processor arranged to control operations of the apparatus. The method comprises: utilizing an ordinary timer to provide the processor with time ticks, for use of timing control; and utilizing a hardware-based OS timer to provide the processor with at least one scheduler timer, for use of the system timer scheduler service.

It is an advantage of the claimed invention that, the claimed invention apparatus and method can give considerations to both run-time power consumption and sleep mode power consumption. For example, the hardware-based OS timer can support an event-based OS timer scheduler to save the run-time power consumption. In another example, the hardware-based OS timer can support timer alignment in accordance with modulator/demodulator (modem) activities to minimize the sleep mode power consumption.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
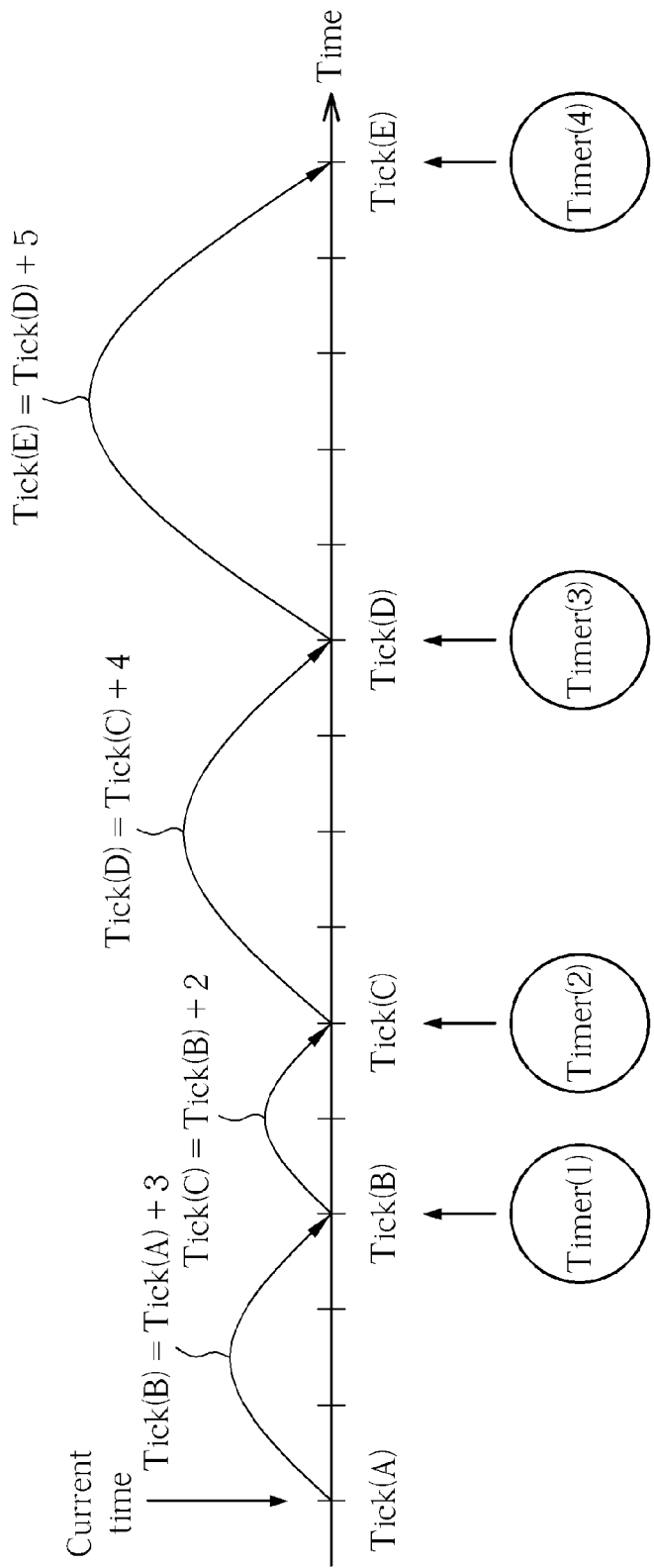
FIGS. 1A-1D illustrate some design schemes regarding a system timer scheduler service according to some embodiments of the present invention.
Figure 1B:
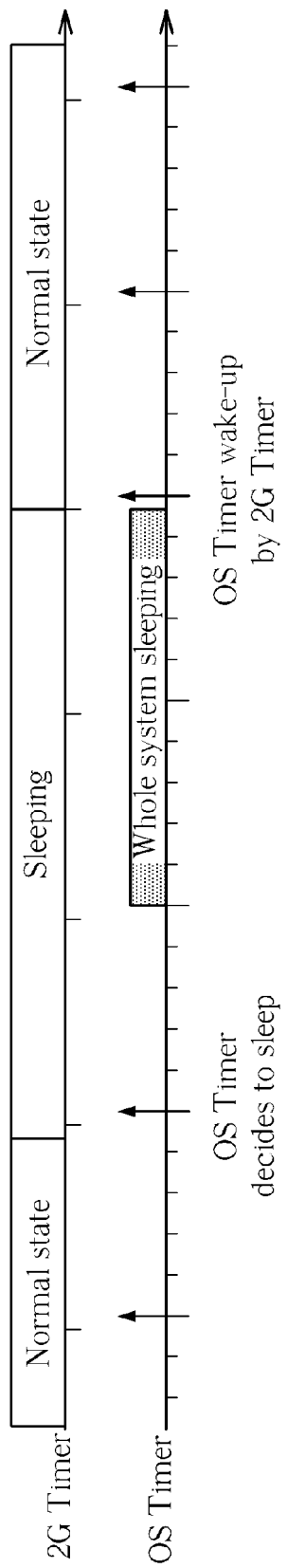
Figure 1C:
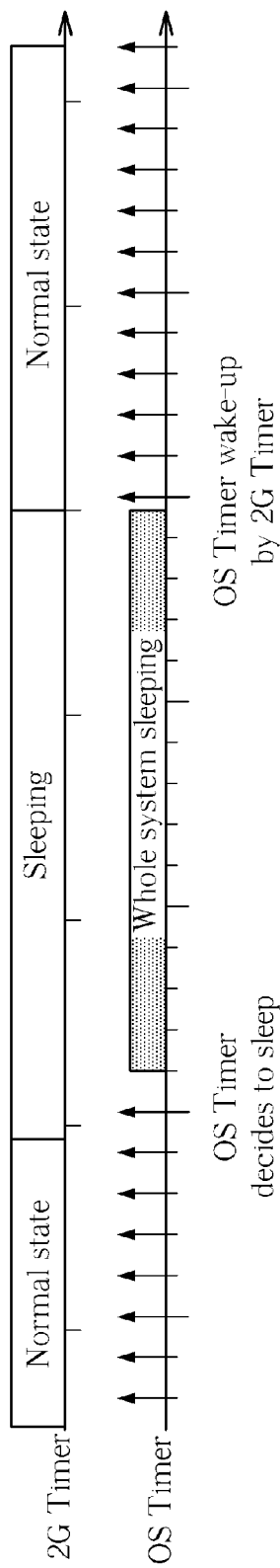
Figure 1D:
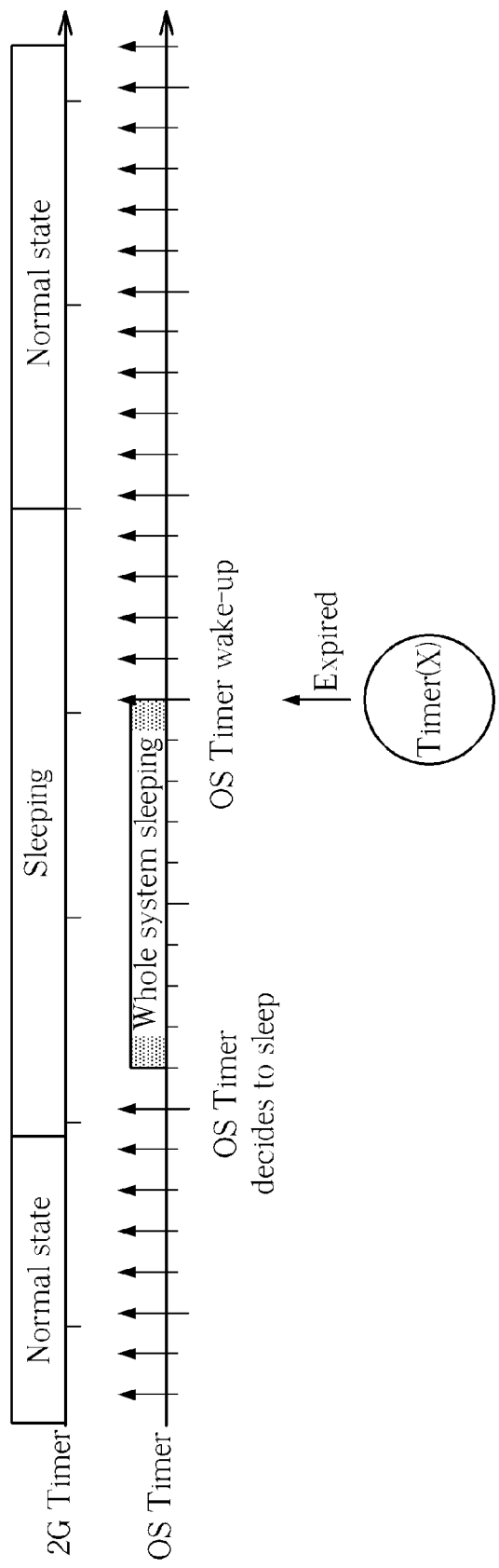
Figure 2A:
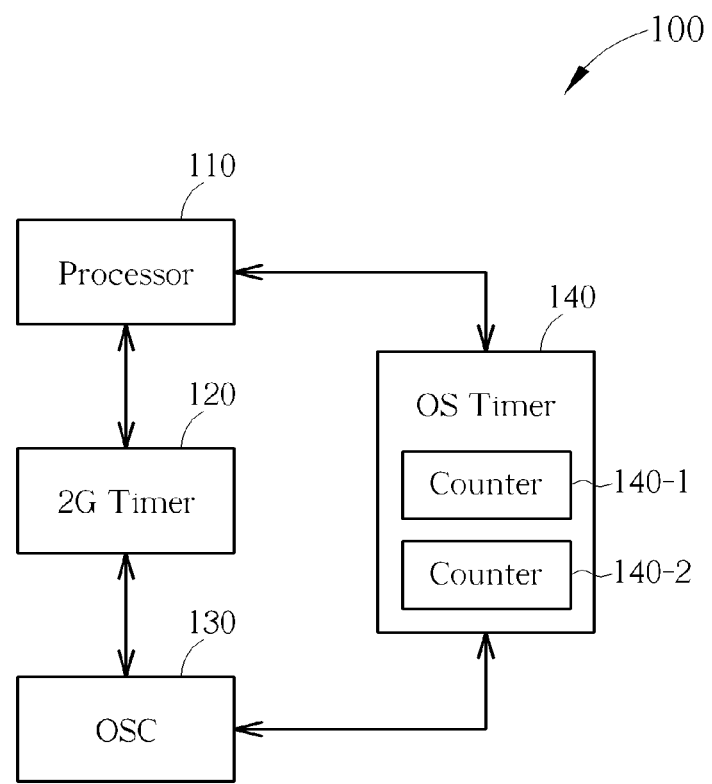
FIG. 2A is a diagram of an apparatus for performing timer management regarding a system timer scheduler service according to an embodiment of the present invention.
Figure 2B:
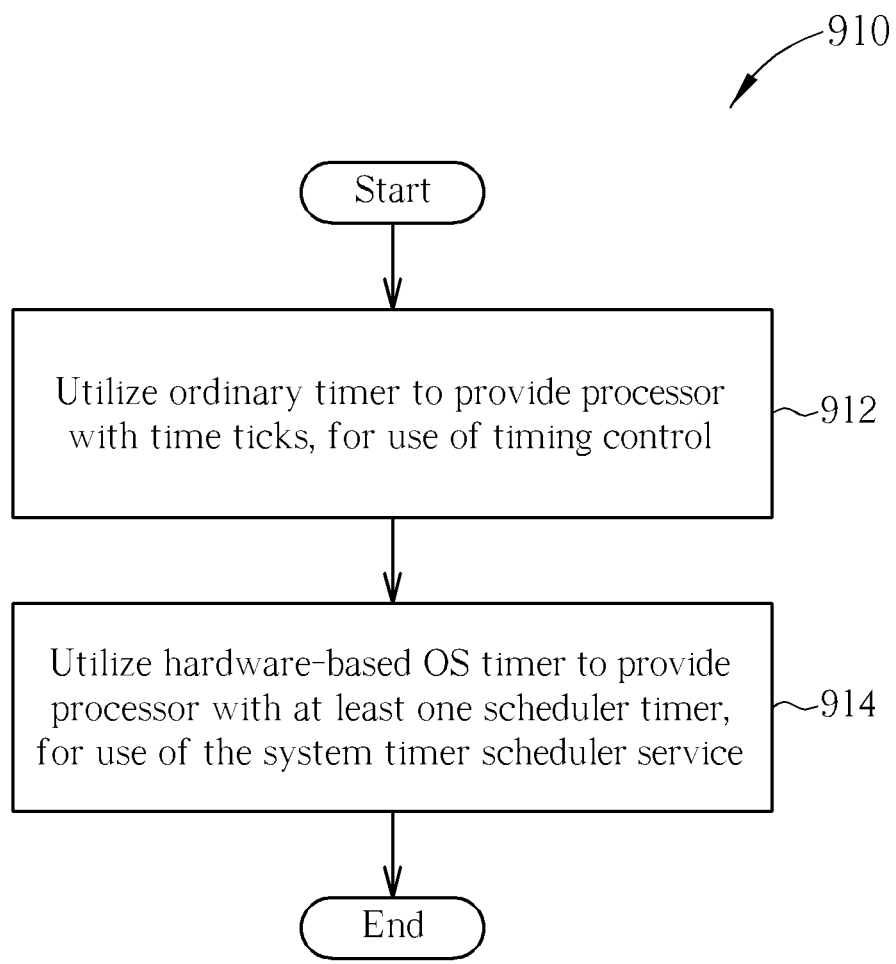
FIG. 2B is a flowchart of a method for performing timer management regarding a system timer scheduler service according to an embodiment of the present invention.
Figure 3:
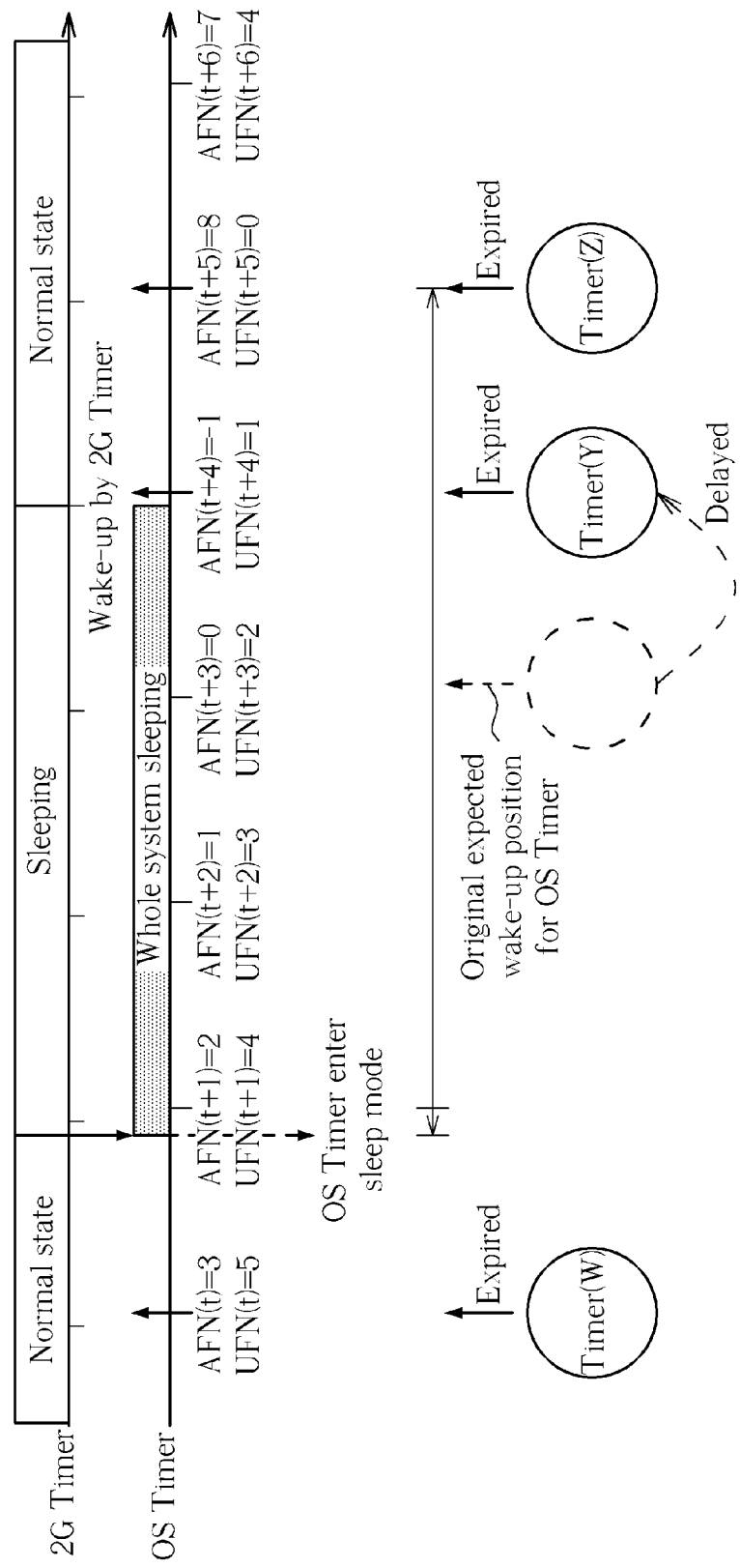
FIG. 3 illustrates some implementation details of the method shown in FIG. 2B according to an embodiment of the present invention.

FIGS. 1A-1D illustrate some design schemes regarding a system timer scheduler service according to some embodiments of the present invention, where these design schemes are illustrated for better comprehension of the other embodiments such as those respectively shown in FIGS. 2A-2B and FIG. 3. In particular, the system timer scheduler service can be implemented for a Real Time Operating System (RTOS).

Referring to FIG. 1A, the system timer scheduler service can provide some scheduler timers (e.g. scheduler timer events, or scheduler events), such as the scheduler timers Timer(1), Timer(2), Timer(3), and Timer(4) illustrated at the bottom of FIG. 1A, and these scheduler timers can be utilized for controlling the timing of some tasks/applications (e.g. at least one task and/or at least one application) executed by a processor within an apparatus under consideration. For example, some operations of the apparatus may be involved with the time ticks obtained from an ordinary timer such as that typically utilized in a second generation (2G) mobile phone, and more particularly, from the so-called 2G timer (labeled "2G Timer" in FIGS. 1B-1D, FIG. 2A, and FIG. 3 in the respective embodiments), where a duration of a tick frame (and more particularly, the period of the time ticks of the 2G timer) is typically 4.615 milliseconds (ms). According to this embodiment, some operations of the scheduler timers such as those shown in FIG. 1A may be performed based upon another physical timer such as a second physical timer. For example, the scheduler timers may operate based upon the time ticks of the second physical timer that is specialized for these scheduler timers. This is for illustrative purposes only, and is not meant to be a limitation of the present invention. According to some variations of this embodiment, the scheduler timers may be implemented in accordance with event-based design schemes, and may operate based upon the second physical timer. In this embodiment, suppose that the time tick value for the current time is Tick(A), and that the expected time tick values for the expiration time of the scheduler timers Timer(1), Timer(2), Timer(3), and Timer(4) are Tick(B), Tick(C), Tick(D), and Tick(E), respectively. As shown in FIG. 1A, the expected time tick values Tick(B), Tick(C), Tick(D), and Tick(E) can be expressed as follows:

$$Tick(B)=Tick(A)+3;$$

$$Tick(C)=Tick(B)+2;$$

$$Tick(D)=Tick(C)+4; \text{ and}$$

$$Tick(E)=Tick(D)+5.$$

Please note that one or more scheduler timers can be further utilized for expiration time control of one or more other tasks/applications (e.g. at least one other task and/or at least one other application). For example, a task/application may utilize a scheduler timer Timer(5) to control the expiration time of this task/application to be between those of the tasks/applications respectively utilizing the scheduler timers Timer(1) and Timer(2), where the expected time tick value for the expiration time of the scheduler timers Timer(5) is Tick(F). In this situation, the associated expected time tick values can be re-arranged as follows:

$$Tick(B)=Tick(A)+3;$$

$$Tick(F)=Tick(B)+1;$$

$$Tick(C)=Tick(F)+1;$$

$$Tick(D)=Tick(C)+4; \text{ and}$$

$$Tick(E)=Tick(D)+5.$$

According to some embodiments of the present invention, in order to design the second physical timer such as a hardware-based Operating System (OS) timer (labeled "OS Timer" in FIGS. 1B-1D, FIG. 2A, and FIG. 3 in the respective embodiments) for the system timer scheduler service, a duration of a tick frame of the hardware-based OS timer (and more particularly, the period of the time ticks of the hardware-based OS timer) should be determined first. For example, the duration of a tick frame of the hardware-based OS timer in the embodiment shown in FIG. 1C is different from that in the embodiment shown in FIG. 1B.

Referring to FIG. 1B, the duration of a tick frame of the hardware-based OS timer can be the same as that of a tick frame of the ordinary timer. In particular, the period of the time ticks of the hardware-based OS timer can be the same as that of the time ticks of the ordinary timer. It is an advantage of the embodiment shown in FIG. 1B that, when implementing the second physical timer such as the hardware-based OS timer, the upper layer (e.g. the OS) has no need to be changed. In some critical situations, however, additional power consumption of the whole system may be introduced, for up to a duration of a tick frame, such as 4.615 ms.

More specifically, when the ordinary timer such as the 2G timer (labeled "2G Timer" in FIG. 1B) exits a normal mode (e.g. the normal state shown in the left of FIG. 1B) and enters a sleep mode (labeled "Sleeping" in FIG. 1B) at the end of a tick frame of the 2G timer, the hardware-based OS timer (labeled "OS Timer" in FIG. 1B) decides to sleep at the end of the corresponding tick frame of the hardware-based OS timer, where the whole chip of the apparatus under consideration falls asleep at the end of the next tick frame of the hardware-based OS timer, i.e. the beginning of the shaded portion labeled "Whole chip sleeping" in FIG. 1B. Thus, the power consumption due to the one frame delay of falling asleep is introduced. In addition, when the ordinary timer such as the 2G timer exits the sleep mode and re-enters the normal mode (e.g. the normal state shown in the right of FIG. 1B) at the end of another tick frame of the 2G timer, the hardware-based OS timer wakes up, where the time of the hardware-based OS timer's wake up triggered by the 2G timer (labeled "OS Timer wake-up by 2G Timer" in FIG. 1B) is a little bit later than the end of the shaded portion labeled "Whole chip sleeping" in FIG. 1B.

Referring to FIG. 1C, which illustrates a variation of the embodiment shown in FIG. 1B, the duration of a tick frame of the hardware-based OS timer can be much shorter than that of a tick frame of the ordinary timer. In particular, the period of the time ticks of the hardware-based OS timer can be much shorter than that of the time ticks of the ordinary timer. It is an advantage of the embodiment shown in FIG. 1C that, the power consumption of the sleep mode in some critical situations such as those mentioned above can be reduced. However, when implementing the second physical timer such as the hardware-based OS timer, the upper layer (e.g. the OS) has to be changed in accordance with the duration of a tick frame of the hardware-based OS timer, and more particularly, the period of the time ticks of the hardware-based OS timer. In addition, regarding a non-sleep mode such as the normal mode (e.g. the normal state shown in the right of FIG. 1C), more run-time power consumption of the whole system than that in the embodiment shown in FIG. 1B may be introduced due to some redundant interrupts for OS ticks (e.g. the time ticks of the hardware-based OS timer).

More specifically, when the ordinary timer such as the 2G timer (labeled "2G Timer" in FIG. 1C) exits the normal mode (e.g. the normal state shown in the left of FIG. 1C) and enters the sleep mode (labeled "Sleeping" in FIG. 1C) at the end of a tick frame of the 2G timer, the hardware-based OS timer (labeled "OS Timer" in FIG. 1C) decides to sleep at the end of the corresponding tick frame of the hardware-based OS timer, where the whole chip of the apparatus under consideration falls asleep at the end of the next tick frame of the hardware-based OS timer, i.e. the beginning of the shaded portion labeled "Whole chip sleeping" in FIG. 1C. Thus, the power consumption due to the one frame delay of falling asleep is introduced, and is much less than that in the embodiment shown in FIG. 1B because of the much shorter duration of the tick frame of the hardware-based OS timer. In addition, when the ordinary timer such as the 2G timer exits the sleep mode and re-enters the normal mode (e.g. the normal state shown in the right of FIG. 1C) at the end of another tick frame of the 2G timer, the hardware-based OS timer wakes up, where the time of the hardware-based OS timer's wake up triggered by the 2G timer (labeled "OS Timer wake-up by 2G Timer" in FIG. 1C) is a little bit later than the end of the shaded portion labeled "Whole chip sleeping" in FIG. 1C.

Referring to FIG. 1D, which illustrates a variation of the embodiment shown in FIG. 1C, the hardware-based OS timer (labeled "OS Timer" in FIG. 1D) wakes up due to the expiration time control of the first scheduler timer Timer(X) in the sleep mode (labeled "Sleeping" in FIG. 1D), where the time of the hardware-based OS timer's wake up (labeled "OS Timer wake-up" in FIG. 1D) is the expiration time of the scheduler timer Timer(X), i.e. the end of the shaded portion labeled "Whole chip sleeping" in FIG. 1D. This is for illustrative purposes only, and is not meant to be a limitation of the present invention. According to some variations of this embodiment, in a situation where the task/application utilizing the scheduler timer Timer(X) is delayable, the expiration time of the scheduler timer Timer(X) may be at or after the time point when the ordinary timer such as the 2G timer exits the sleep mode and re-enters the normal mode (e.g. the normal state shown in the right of FIG. 1D). For example, the expiration time of the scheduler timer Timer(X) may be aligned with a specific time of paging reception. This is the so-called "timer-alignment mechanism" to further improve low power performance.

Please refer to FIG. 2A, which illustrates a diagram of an apparatus 100 for performing timer management regarding a system timer scheduler service, such as the aforementioned system timer scheduler service implemented for the RTOS, according to an embodiment of the present invention. The apparatus 100 may comprise at least one portion (e.g. a portion or all) of an electronic device such as a multi-function mobile phone, a multi-function personal digital assistant (PDA), or a portable electronic device equipped with mobile phone and PDA functions. Here, the multi-function mobile phone mentioned above can be taken as an example of the apparatus 100 of this embodiment. This is for illustrative purposes only, and is not meant to be a limitation of the present invention. According to some variations of this embodiment, the apparatus 100 can be implemented as the multi-function PDA or the portable electronic device mentioned above. According to some other variations of this embodiment, the apparatus 100 can be implemented as other kinds of electronic devices.

As shown in FIG. 2A, the apparatus 100 comprises a processor 110, an ordinary timer 120 (labeled "2G Timer" in FIG. 2A), an oscillator 130 (labeled "OSC" in FIG. 2A), and a hardware-based OS timer 140 (labeled "OS Timer" in FIG. 2A) such as that mentioned above, where the aforementioned 2G timer is taken as an example of the ordinary timer 120 in this embodiment. According to this embodiment, the processor 110 is arranged to control operations of the apparatus 100, and the ordinary timer 120 and the hardware-based OS timer 140 operate according to a clock signal generated by the oscillator 130. In addition, the ordinary timer 120 is arranged to provide the processor 110 with time ticks, for use of timing control. Additionally, the hardware-based OS timer 140 is arranged to provide the processor 110 with at least one scheduler timer, for use of the system timer scheduler service. In practice, the processor 110 and the ordinary timer 120 can be coupled to some other components of the apparatus 100, such as analog front end and modulator/demodulator, however, such connections are not shown in FIG. 2A so as to not unduly complicate the drawing figure.

Based upon the architecture shown in FIG. 2A, it is feasible to integrate some implementation details respectively disclosed in at least a portion of the embodiments shown in FIGS. 1A-1D (and variations thereof) into the same timer scheduler mechanism, in order to have all of the advantages of theses embodiments, without introducing respective disadvantages thereof (if any). Referring to FIG. 2B, related details are further described in the following.

FIG. 2B is a flowchart of a method 910 for performing timer management regarding a system timer scheduler service, such as the aforementioned system timer scheduler service implemented for the RTOS, according to an embodiment of the present invention. The method 910 can be applied to the apparatus 100 shown in FIG. 2A, and more particularly, can be applied to the ordinary timer 120 and the hardware-based OS timer 140. The method is described as follows.

In Step 912, the apparatus 100 utilizes an ordinary timer such as the ordinary timer 120 (labeled "2G Timer" in FIG. 2A) to provide the processor 110 with time ticks, for use of timing control, where the ordinary timer 120 of this embodiment can be the aforementioned 2G timer in any of the embodiments shown in FIGS. 1B-1D. This is for illustrative purposes only, and is not meant to be a limitation of the present invention. According to some variations of this embodiment, the ordinary timer 120 can be other kinds of ordinary timers, rather than a timer in any conventional 2G mobile phone.

In Step 914, the apparatus 100 utilizes a hardware-based OS timer such as the hardware-based OS timer 140 (labeled "OS Timer" in FIG. 2A) to provide the processor 110 with at least one scheduler timer, for use of the system timer scheduler service. For example, the hardware-based OS timer 140 may comprise two counters 140-1 and 140-2 for counting an alignment frame number (AFN) and an un-alignment frame number (UFN), respectively. Here, the UFN can also be referred to as the non-alignment frame number (NFN). In practice, the AFN can be utilized for controlling an expiration time of a target event that is delayable in a sleep mode, and the UFN can be utilized for controlling an expiration time of a target event that is non-delayable in any mode. More particularly, the two counters 140-1 and 140-2 can be count-down timers, where the UFN is non-negative, and there is no limitation for the AFN to temporarily reach a negative value.

According to a special case of this embodiment, with the aid of the hardware-based OS timer 140, the system timer scheduler service can provide an event-based OS timer scheduler. More particularly, with the aid of the hardware-based OS timer 140, the system timer scheduler service provides the event-based OS timer scheduler to save run-time power consumption. In addition, with the aid of the hardware-based OS timer 140, the system timer scheduler service can provide timer alignment in accordance with modulator/demodulator (modem) activities, and whether the modem activities are inactive depends on whether the ordinary timer 120 is in a sleep mode. More particularly, with the aid of the hardware-based OS timer 140, the system timer scheduler service provides the timer alignment in accordance with the modem activities to minimize sleep mode power consumption (i.e. the power consumption of the sleep mode).

FIG. 3 illustrates some implementation details of the method 910 shown in FIG. 2B according to an embodiment of the present invention. Please note that a duration of a tick frame of the hardware-based OS timer 140 (labeled "OS Timer" in FIG. 2A) can be the same as that of a tick frame of the ordinary timer 120 (labeled "2G Timer" in FIG. 2A). More particularly, the period of the time ticks of the hardware-based OS timer 140 can be the same as that of the time ticks of the ordinary timer 120.

Suppose that a task/application utilizes a scheduler timer Timer(W) to control the expiration time of this task/application to be at the last tick frame before the ordinary timer 120 (labeled "2G Timer" in FIG. 3) exits the normal mode (e.g. the normal state shown in the left of FIG. 3). For example, when the scheduler timer Timer(W) indicates that the time is expired at the time point t, under the control of the processor 110, the hardware-based OS timer 140 forcibly sets the counter values of the two counters 140-1 and 140-2 (i.e. the AFN and the UFN) to be 3 and 5, respectively. That is, AFN(t)=3 and UFN(t)=5. In addition, when the ordinary timer 120 enters the sleep mode (labeled "Sleeping" in FIG. 3), the hardware-based OS timer 140 enters the sleep mode accordingly (labeled "OS Timer enter sleep mode" in FIG. 3), causing the whole system of the apparatus 100 to fall asleep. More particularly, when the ordinary timer 120 enters the sleep mode at the end of this tick frame, the hardware-based OS timer 140 enters the sleep mode at the same time (i.e. the beginning of the shaded portion labeled "Whole system sleeping" in FIG. 3).

As time goes by, the two counters 140-1 and 140-2 respectively decrease their counter values such as the AFN and the UFN accordingly. For example, at the time point (t+1), AFN (t+1)=2 and UFN(t+1)=4. Similarly, at the time point (t+2), AFN(t+2)=1 and UFN(t+2)=3. In addition, at the time point (t+3), AFN(t+3)=0 and UFN(t+3)=2. Please note that a scheduler timer Timer(Y) is utilized by a task/application that is delyable, and therefore, it is determined according to the method 910 that the scheduler timer Timer(Y) operates in accordance with the AFN since there is no limitation for the AFN to temporarily reach a negative value. As a result of delaying the expiration time of the scheduler timer Timer(Y), the scheduler timer Timer(Y) is associated to the time point (t+4), which is a time point after the hardware-based OS timer's wake up triggered by the ordinary timer 120 such as the 2G timer (labeled "Wake-up by 2G Timer" in FIG. 3). More particularly, the time point (t+4) is the first time point for decreasing the counter values of the two counters 140-1 and 140-2 after the ordinary timer 120 just exits the sleep mode and re-enters the normal mode (e.g. the normal state shown in the right of FIG. 3).

At the time point (t+4), the two counters 140-1 and 140-2 respectively decrease their counter values AFN and UFN. It is illustrated in FIG. 3 that AFN(t+4)=−1 and UFN(t+3)=1, where AFN(t+4) may have the temporarily value of −1 at that moment. As the scheduler timer Timer(Y) indicates that the time is expired, under the control of the processor 110, the hardware-based OS timer 140 forcibly sets the counter value of the counter 140-1, AFN, to be a specific value for the next scheduler timer (not shown in FIG. 3) utilized by a task/application that is delyable. In a situation where this specific value is 9, the AFN is reset as 9 at the time point (t+4).

At the time point (t+5), the two counters 140-1 and 140-2 respectively decrease their counter values AFN and UFN. It is illustrated in FIG. 3 that AFN(t+5)=8 and UFN(t+5)=0, where UFN(t+5) may have the temporarily value of 0 at that moment. As the scheduler timer Timer(Z) indicates that the time is expired, under the control of the processor 110, the hardware-based OS timer 140 forcibly sets the counter value of the counter 140-2, UFN, to be a specific value for the next scheduler timer (not shown in FIG. 3) utilized by a task/application that is non-delyable. In a situation where this specific value is 5, the UFN is reset as 5 at the time point (t+5).

Afterward, at the time point (t+6), the two counters 140-1 and 140-2 respectively decrease their counter values AFN and UFN. As a result, AFN(t+6)=7 and UFN(t+6)=4.

According to this embodiment, the apparatus 100 and the associated method 910 can give considerations to both run-time power consumption and sleep mode power consumption. For example, the hardware-based OS timer 140 can support the event-based OS timer scheduler to save the run-time power consumption (e.g. the run-time power consumption around the intervals between any two of the time points (t+4), (t+5), (t+6), etc. in the normal mode). In another example, the hardware-based OS timer 140 can support the timer alignment in accordance with the modem activities to minimize the sleep mode power consumption (e.g. the sleep mode power consumption around the tick frame between the time points (t+3) and (t+4)) by reducing the probability of interrupting the sleep mode.

Those skilled in the art will readily observe that numerous modifications and alterations of the device and method may be made while retaining the teachings of the invention.

What is claimed is:

1. An apparatus for performing timer management regarding a system timer scheduler service, comprising:
   a processor arranged to control operations of the apparatus;
   an ordinary timer arranged to provide the processor with time ticks, for use of timing control; and
   a hardware-based Operating System (OS) timer arranged to provide the processor with at least one scheduler timer, for use of the system timer scheduler service, wherein the hardware-based OS timer comprises two counters for counting an alignment frame number (AFN) and an un-alignment frame number (UFN), respectively.

2. The apparatus of claim 1, wherein with aid of the hardware-based OS timer, the system timer scheduler service provides an event-based OS timer scheduler.

3. The apparatus of claim 2, wherein with the aid of the hardware-based OS timer, the system timer scheduler service provides the event-based OS timer scheduler to save run-time power consumption.

4. The apparatus of claim 1, wherein with aid of the hardware-based OS timer, the system timer scheduler service provides timer alignment in accordance with modulator/demodulator (modem) activities; and whether the modem activities are inactive depends on whether the ordinary timer is in a sleep mode.

5. The apparatus of claim 4, wherein with the aid of the hardware-based OS timer, the system timer scheduler service provides timer alignment in accordance with the modulator/demodulator (modem) activities to minimize sleep mode power consumption.

6. The apparatus of claim 1, wherein the AFN is utilized for controlling an expiration time of a target event that is delayable in a sleep mode, and the UFN is utilized for controlling an expiration time of a target event that is non-delayable in any mode.

7. The apparatus of claim 1, wherein the two counters are count-down timers; and the UFN is non-negative, and there is no limitation for the AFN to temporarily reach a negative value.

8. The apparatus of claim 1, wherein a duration of a tick frame of the hardware-based OS timer is the same as that of a tick frame of the ordinary timer.

9. The apparatus of claim 8, wherein when the ordinary timer enters a sleep mode, the hardware-based OS timer enters the sleep mode accordingly, causing a whole chip of the apparatus to fall asleep.

10. The apparatus of claim 9, wherein when the ordinary timer enters the sleep mode, the hardware-based OS timer enters the sleep mode at a same time.

11. A method for performing timer management regarding a system timer scheduler service, the method being applied to an apparatus, the apparatus comprising a processor arranged to control operations of the apparatus, the method comprising:

utilizing an ordinary timer to provide the processor with time ticks, for use of timing control; and utilizing a hardware-based Operating System (OS) timer to provide the processor with at least one scheduler timer, for use of the system timer scheduler service, wherein the hardware-based OS timer comprises two counters for counting an alignment frame number (AFN) and an un-alignment frame number (UFN), respectively.

12. The method of claim 11, wherein with aid of the hardware-based OS timer, the system timer scheduler service provides an event-based OS timer scheduler.

13. The method of claim 12, wherein with the aid of the hardware-based OS timer, the system timer scheduler service provides the event-based OS timer scheduler to save run-time power consumption.

14. The method of claim 11, wherein with aid of the hardware-based OS timer, the system timer scheduler service provides timer alignment in accordance with modulator/demodulator (modem) activities; and whether the modem activities are inactive depends on whether the ordinary timer is in a sleep mode.

15. The method of claim 14, wherein with the aid of the hardware-based OS timer, the system timer scheduler service provides timer alignment in accordance with the modulator/demodulator (modem) activities to minimize sleep mode power consumption.

16. The method of claim 11, wherein the step of utilizing the hardware-based OS timer to provide the processor with the at least one scheduler timer further comprises:

utilizing the AFN to control an expiration time of a target event that is delayable in a sleep mode; and utilizing the UFN to control an expiration time of a target event that is non-delayable in any mode.

17. The method of claim 11, wherein the two counters are count-down timers; and the UFN is non-negative, and there is no limitation for the AFN to temporarily reach a negative value.

18. The method of claim 11, wherein a duration of a tick frame of the hardware-based OS timer is the same as that of a tick frame of the ordinary timer.

19. The method of claim 18, further comprising:

when the ordinary timer enters a sleep mode, controlling the hardware-based OS timer to enter the sleep mode accordingly, causing a whole chip of the apparatus to fall asleep.

20. The method of claim 19, wherein the step of controlling the hardware-based OS timer to enter the sleep mode accordingly further comprises:

when the ordinary timer enters the sleep mode, controlling the hardware-based OS timer to enter the sleep mode at a same time.

* * * * *